Jan. 12, 1943.                G. BAKOS                2,308,260
                              FILM CAMERA
                    Filed June 12, 1939          3 Sheets-Sheet 1

INVENTOR
GEORGE BAKOS
BY
ATTORNEY

Jan. 12, 1943.　　　　　G. BAKOS　　　　2,308,260
FILM CAMERA
Filed June 12, 1939　　　3 Sheets-Sheet 2

INVENTOR
GEORGE BAKOS
BY
ATTORNEY

Jan. 12, 1943. G. BAKOS 2,308,260
FILM CAMERA
Filed June 12, 1939 3 Sheets-Sheet 3

INVENTOR
GEORGE BAKOS
BY
ATTORNEY

Patented Jan. 12, 1943

2,308,260

UNITED STATES PATENT OFFICE 2,308,260

FILM CAMERA

George Bakos, Prague, Bohemia; vested in the Alien Property Custodian

Application June 12, 1939, Serial No. 278,677
In Czechoslovakia November 2, 1937

4 Claims. (Cl. 88—16.2)

My invention relates to film cameras, and more particularly to cameras adapted to record picture and sound.

It is an object of my invention to provide a camera which allows selectively to record picture and sound on one and the same film band, or on separate films.

A further object of my invention is to provide a camera of the above mentioned type in which the transporting means for separate picture and sound films are so arranged that one of them may be operated without operating the other, or if desired, both the sound film and the picture film may be operated together.

It is a still further object of my invention to provide improved means for drivingly connecting the camera proper with the magazine containing the film spools.

It is also an object of this invention to provide a film camera which is simple in construction, readily accessible, cheap in manufacture, and universal in use.

The above and other objects and advantages will appear more fully hereinafter from a consideration of the detailed description which follows, with reference to the accompanying drawings, wherein is illustrated an embodiment of my invention. It is to be expressly understood, however, that the drawings are for the purpose of illustration only, and are not designed as a definition of the limits of the invention, reference being had for this purpose to the appended claims.

In the drawings, wherein like reference characters refer to like parts throughout the several views:

Fig. 1 is a perspective view of the entire assembly;

Fig. 2 diagrammatically illustrates the threading of the film when recording picture and sound on one and the same film;

Fig. 3 is a diagrammatic illustration of the way in which the films are threaded when picture and sound are recorded on separate films;

Fig. 4 diagrammatically illustrates in elevation the drive for the film transporting mechanism;

Figure 1:
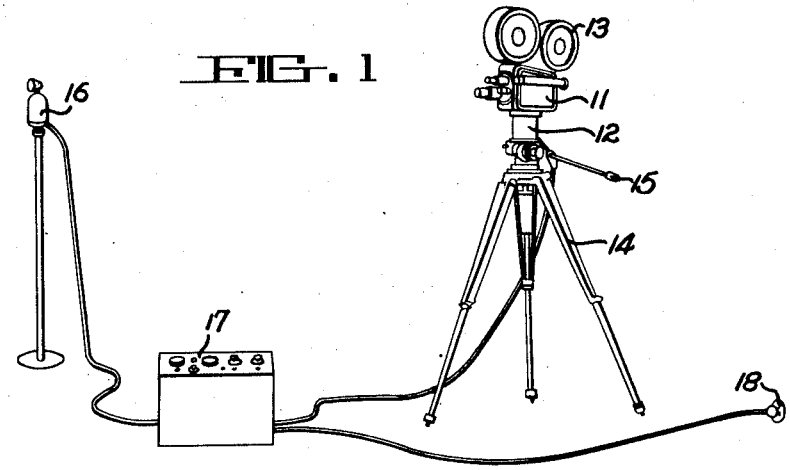

Referring first to Fig. 1, the camera proper 11 with its driving motor 12 and the film magazine 13 is supported by the tripod 14 which, by means of the shifting lever 15, allows the adjustment of the apparatus in the usual manner. Connected with the device 11 is the microphone 16 and the amplifier 17 as is common practice; the current for the amplifier may be taken either from a normal current line, or from a battery.

The camera 11 is so constructed that it may be loaded with one film for recording picture and sound on one and the same film, or with two films for recording picture and sound on separate films. To this end, the casing 19 is provided with four slots 20, 21, 22 and 23 through which the film or the films, as the case may be, pass to or from the magazine 13, said magazine being adapted to be connected with the casing 19 so that no light can enter the magazine from the outside.

Figure 2:
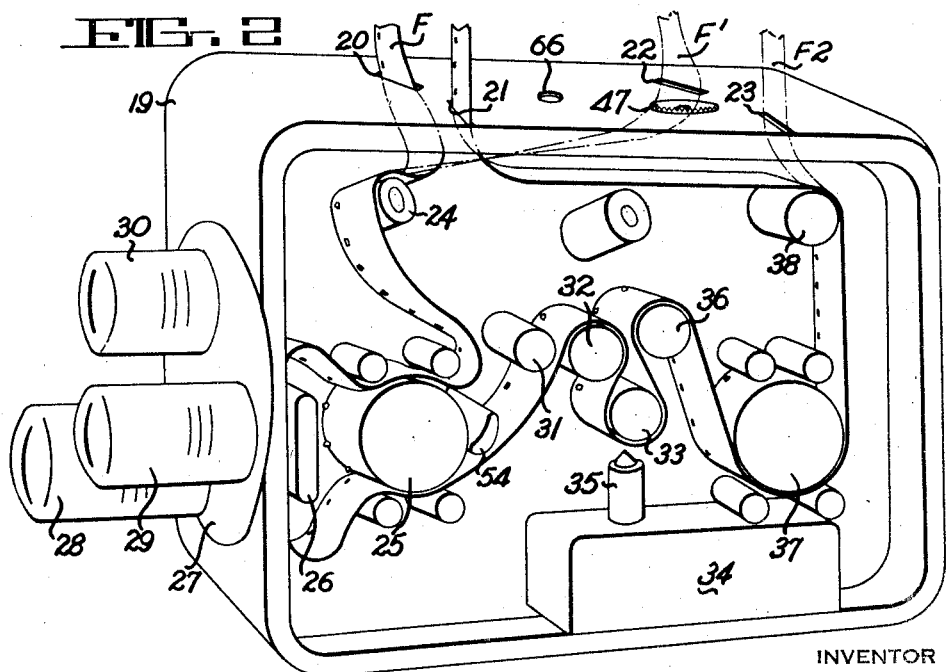

When it is intended to record picture and sound on one and the same film, the film is advantageously threaded in the manner illustrated in Fig. 2. According to the threading arrangement illustrated therein, film F coming from the magazine is passed, for instance, through slot 20 and then over the inclined leading roller 24 into the recording plane. The leading roller 24 is provided with a lateral flange (not shown) to prevent the film from sliding off. The film F is passed to the gate by means of the transporting roller or sprocket 25, and after being exposed is passed away from the gate by the same sprocket. In front of the gate is arranged a disc 27 carrying the objectives 28, 29, 30 and adapted to be turned so as to selectively move one of said objectives into operative position in front of the gate. After having passed the sprocket 25 the film is passed over the guiding rollers 31 and 32 to the supporting member 33 where the sound is recorded; member 33 may be fixed or may be rotatable and, in the latter instance, if desired, may also be connected with a fly wheel to assure uniform movement of the member 33. The sound recording mechanism, including optics, light source and light controlling device, is housed in the casing 34, and the modulated light is projected upon the film by means of the sound recording optics 35. From the member 33 the film is passed over guiding roller 36, transporting roller or sprocket 37 and roller 38 through slot 21 to the winding up spool in the magazine 13. It is, however, understood that, if desired, the film may as well be returned to the magazine through slot 23. In the latter instance, the film would be introduced into and returned from the casing 19 as indicated in dot-dash lines designated F″ and F², respectively.

Figure 3:
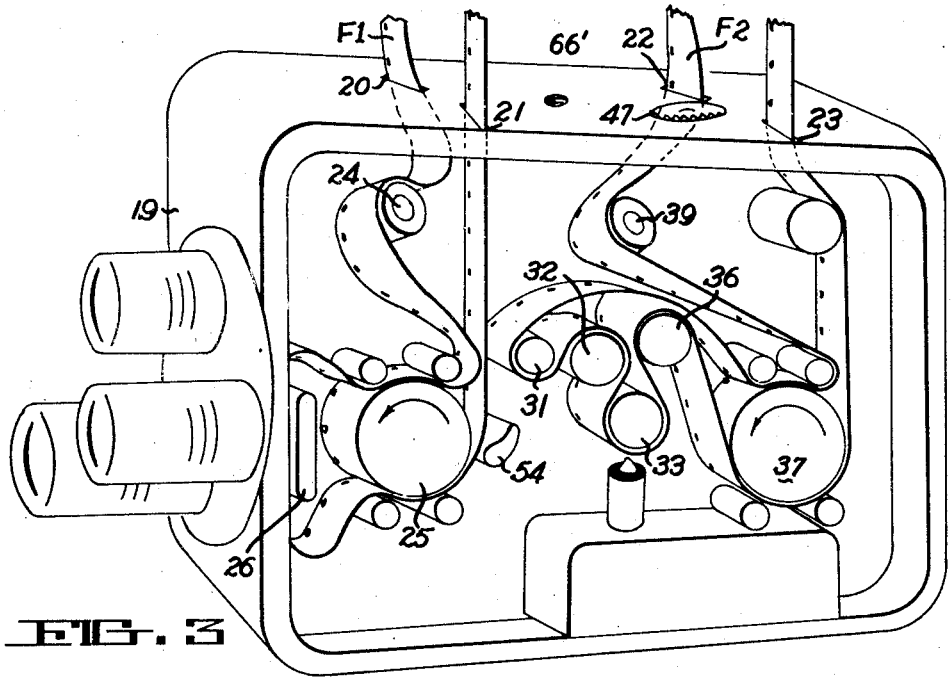

When it is intended to record picture and sound on two separate films, the device shown in Fig. 2 may likewise be used, however, with the threading arrangement illustrated in Fig. 3. In Fig. 3, F1 is the picture film, while the sound film is designated as F2. The picture film F1 passes from the magazine 13 through the slant slot 20 into the casing 19 and, similarly to the arrangement in Fig. 2, passes over the inclined guiding roller 24 and the sprocket 25 to the gate 26. The exposed film is then passed again over sprocket 25 and returned through slot 21 to a winding up spool in the magazine. The sound film F2 is introduced through slot 22 into the casing 19 and passed over the inclined roller 39 into the recording plane. The transporting roller or sprocket 37 passes film F2 over rollers 31, 32, 33 and 36 which return the film through slot 23 to a second winding up spool in the magazine.

Figure 4:
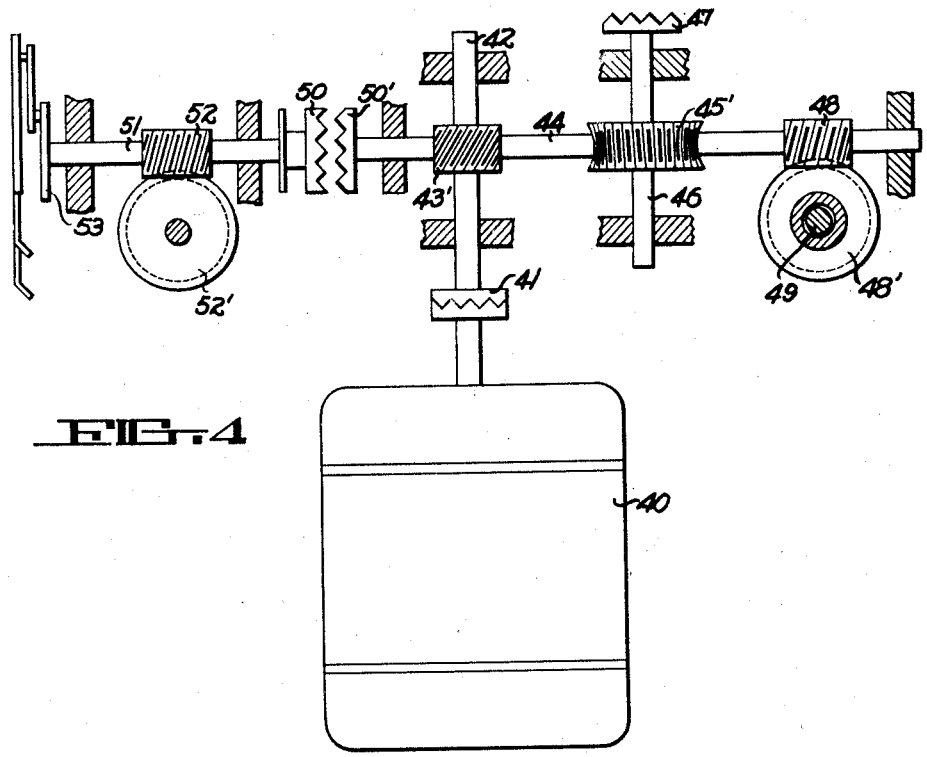
Figure 5:
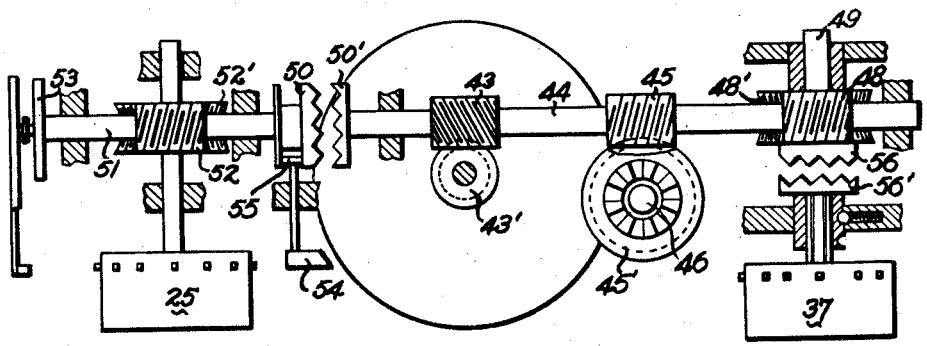
Fig. 5 is a top view of Fig. 4.

Referring now to Fig. 4 illustrating the drives of the sprockets 25 and 37 and of the winding up spools in the magazine, 40 designates a substantially vertically arranged motor adapted to be connected by means of a clutch 41 with the main shaft 42. By means of the screw gear system 43, 43' the movement of the motor 40 is transferred to the shaft 44 driving the shaft 46 by means of worm 45 and worm wheel 45'. Shaft 46 carries a clutch member 47 adapted to engage a corresponding clutch member on a drive shaft for the winding up spools in the magazine as will later be described in detail. Shaft 44 also rotates shaft 49 by means of worm 48 and worm wheel 48'. Clutch member 50 connected with but slidable on shaft 51 is adapted to be clutched to a corresponding clutch member 50' attached or keyed to shaft 44, thereby drivingly connecting shaft 44 with shaft 51 which on one hand may drive sprocket 25 by means of worm 52 and worm wheel 52', and on the other hand may operate the gripping mechanism 53 for advancing the film step by step adjacent the gate. As will be seen from Fig. 5, clutch member 50 may be engaged with or disengaged from clutch member 50' by means of the lever 54 and eccentric 55. Similarly, also sprocket 37 may be selectively connected with or disconnected from the main drive 43 by clutch member 56' adapted to engage or disengage a corresponding clutch member 56 keyed or attached to shaft 49. The operation of clutch member 56' may be effected similarly to that of clutch member 50 or in any other desired manner.

As will now be clear from the above, my new camera may be used as a mere picture camera, as a mere sound camera, and also for recording picture and sound at the same time. In the latter instance, according to my invention, it is at any time possible selectively to drive only the transporting means for one film, say, for instance, the picture film, while the transporting means for the other film, in this instance the sound film, is kept in inoperative position.

Figure 6:
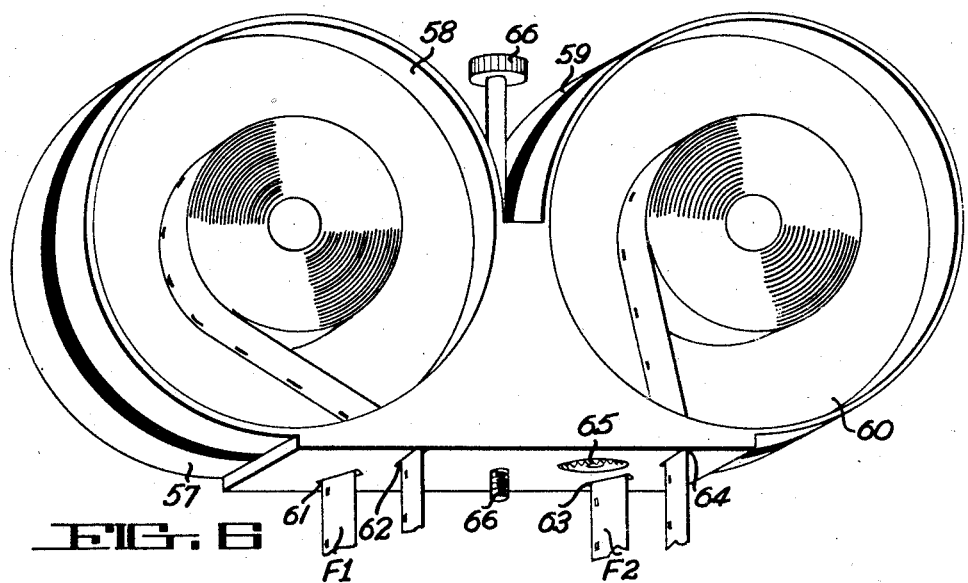
Fig. 6 is a perspective view of a film magazine as may be used in connection with my camera.

Fig. 6 is a perspective view of a film magazine as may be used in connection with the camera according to the invention. This magazine 13 comprises four film casings proper designated 57, 58, 59 and 60, respectively, and arranged in pairs 57, 58 and 59, 60, as is clearly shown in the drawings. The casings 57 and 59 house the non-exposed films; for example, if picture and sound are recorded on separate films, the non-exposed picture film may be housed by the casing 57, while the non-exposed sound film may be arranged in the casing 59. The exposed films are received by casings 58 and 60 adapted to be driven by a friction clutch; preferably, when recording picture and sound on separate films, the exposed picture film is introduced into casing 58 and the exposed sound film into casing 60. The magazine comprises slots 61, 62, 63 and 64 which correspond to the slots 20, 21, 22 and 23 of the casing 19 and are substantially in alignment therewith when the magazine is properly connected with the camera casing 19, thereby enabling a smooth passing of the films through the slots from the magazine into the casing 19 and vice versa. To secure or facilitate the proper positioning of the magazine on the casing 19, guiding means, such as a slot or key (not shown), may be provided on the magazine and the camera casing. The magazine may be rigidly connected with the camera casing by means of screw 66, carried by the magazine and adapted to engage a corresponding thread 66' in the camera casing. The slant arrangement of the slots 61 and 63 with respect to slots 62 and 64, and similarly the slant arrangement of the slots 20 and 22 relative to slots 21 and 23 materially facilitates the passing over of the films from the magazine into the recording plane in the camera casing.

When the magazine is properly positioned on the camera casing 19, clutch member 47 positively engages a similar clutch member 65 connected with a drive for the film spools.

While only one embodiment of the invention has been illustrated and described, various changes in form, arrangement and substitution of parts, which will now appear to those skilled in the art, may be made without departing from the scope of the invention, and reference will therefore be had to the appended claims for a definition of the limits of the invention.

What I claim is:

1. Apparatus for recording picture and sound on two separate films, which comprises recording means for recording pictures on a film, recording means for recording sound on a second film, transporting means for said first film, transporting means for said second film, said two transporting means having their transporting surfaces in alignment with each other, driving means common to said two transporting means, a casing housing said two transporting means and having two rows of slots therein forming passages for said picture and sound films from and into said casing, the slots of one row being inclined to the slots of the other row, and clutching means operable selectively to interrupt the driving connection between the transporting means for said first film and said driving means without disconnecting the latter from the transporting means for said second film, or to interrupt driving connection between the transporting means for said second film and said driving means without affecting the driving connection between the latter and the transporting means for said first film.

2. Film camera comprising in combination picture recording means, sound recording means, transporting means for a first film on which pictures are to be recorded, transporting means for a second film on which sound is to be recorded, driving means common to said two transporting means, synchronizing means to secure synchronous operation of said two transporting means, and clutching means between each of said transporting means and said driving means, said clutching means being operable so as to selectively establish or interrupt driving connection between either one of said transporting means and the common drive without affecting the driving connection between said drive and the other transporting means, said transporting means including two film transporting sprockets spaced from each other and arranged one behind the other with the transporting teeth thereon arranged in substantially one and the same plane.

3. A film camera comprising in combination picture recording means, sound recording means, transporting means for passing a film by said picture recording means, further transporting means for passing a film by said sound recording means, main driving means common to said two transporting means, clutching means between each of said transporting means and said main driving means, said clutching means being operable so as selectively to establish or interrupt driving connection between either one of said transporting means and said main driving means without affecting the driving connection between said main driving means and the other transporting means, and a driving shaft adapted positively to be connected to said main driving means and having a clutch member mounted thereon for direct engagement with a corresponding clutch member of a drive in a film magazine comprising the spools for said films.

4. In a film camera, picture recording means, sound recording means, film transporting means arranged for selectively passing one and the same film by said picture recording means as well as said sound recording means at one and the same recording operation or to pass said film only by one of said recording means while simultaneously passing a second film by said other recording means to record picture and tone on one and the same film or on separate films respectively, said film transporting means including two spaced sprockets with their axes of rotation substantially parallel to each other and the sprocket teeth at one and the same side of said sprockets arranged in substantially the same plane, thereby allowing a film to pass from one of said sprockets to the other sprocket without being laterally deflected, common driving means for said two sprockets, and means operable selectively for driving both sprockets simultaneously, or either one of said sprockets while maintaining the other sprocket stationary.

GEORGE BAKOS.